(12) United States Patent
Finnsson et al.

(10) Patent No.: US 9,145,268 B2
(45) Date of Patent: Sep. 29, 2015

(54) CONVEYOR SYSTEM AND A METHOD FOR PRODUCING A SEQUENCE OF DISCRETE FOOD ITEMS FROM A PLURALITY OF INCOMING FOOD OBJECTS

(71) Applicant: Marel Iceland Ehf, Gardabaer (IS)

(72) Inventors: Thorir Finnsson, Kopavogur (IS); Kristjan Hallvardsson, Kopavogur (IS)

(73) Assignee: MAREL ICELAND EHF, Gardabaer (IS)

( * ) Notice: Subject to any disclaimer, the term of this patent is extended or adjusted under 35 U.S.C. 154(b) by 0 days.

(21) Appl. No.: 14/395,950

(22) PCT Filed: Apr. 19, 2013

(86) PCT No.: PCT/EP2013/001168
§ 371 (c)(1),
(2) Date: Oct. 21, 2014

(87) PCT Pub. No.: WO2013/156159
PCT Pub. Date: Oct. 24, 2013

(65) Prior Publication Data
US 2015/0158676 A1    Jun. 11, 2015

Related U.S. Application Data

(60) Provisional application No. 61/635,375, filed on Apr. 19, 2012.

(30) Foreign Application Priority Data

Apr. 19, 2012    (EP) .................................... 12002755

(51) Int. Cl.
*B65G 47/26*    (2006.01)
*B65G 47/30*    (2006.01)
(Continued)

(52) U.S. Cl.
CPC ................ *B65G 47/30* (2013.01); *B65G 15/22* (2013.01); *B65G 21/14* (2013.01); *B65G 43/08* (2013.01)

(58) Field of Classification Search
CPC ........... B65H 2220/02; B65H 2220/01; B65H 2511/22; B65G 15/26; B65G 21/14; B65G 2203/042; B65G 47/268

USPC ............................ 198/460.1, 460.2, 812, 588
See application file for complete search history.

(56) References Cited

U.S. PATENT DOCUMENTS 4,960,198 A * 10/1990 Hogenkamp .............. 198/461.1
(Continued)

FOREIGN PATENT DOCUMENTS

DE    3546248 A1    7/1987
(Continued)

OTHER PUBLICATIONS

European Search Report; Application No. EP 12 00 2755; Date of Completion of Search: Sep. 6, 2012; Place of Search: The Hague.
(Continued)

*Primary Examiner* — James R Bidwell
(74) *Attorney, Agent, or Firm* — Pearne & Gordon L.L.P.

(57) ABSTRACT

This invention relates to a conveyor system and a method for producing a sequence of discrete food items from a plurality of incoming food objects including at least one food item conveyed by an in-feed conveyor including an in-feed conveyor belt such that the distance between adjacent food objects of said sequence of discrete food objects fulfills a pre-determined distance criterion. A first conveyor belt provided adapted to be placed adjacent to the in-feed conveyor belt and a second conveyor belt is provided adapted to be placed adjacent to the first conveyor belt. The adjacent ends of the first and second conveyors belts are operable connected together via a junction such that their internal position is fixed at all times. An imaging mechanism images the incoming objects so as to obtain image data including image data indicating the length of the incoming objects and distances between adjacent incoming objects. A control unit is provided to operate a back and forth advancement of the junction and thus adjust the active length of the first conveyor. The first conveyor belt acts thus as a buffer for collecting at least one of the incoming food objects from the in-feed conveyor. The control unit operates the delivering of the at least one collected food objects to the second conveyor belt via controllable advancing of the junction from an extended position towards a contracted position of the first conveyor based on the image data.

17 Claims, 10 Drawing Sheets

(51) Int. Cl.
*B65G 15/22* (2006.01)
*B65G 21/14* (2006.01)
*B65G 43/08* (2006.01)

(56) References Cited

U.S. PATENT DOCUMENTS

| | | | | |
|---|---|---|---|---|
| 5,191,965 | A * | 3/1993 | Scheid | 198/460.2 |
| 5,322,154 | A * | 6/1994 | Lenherr | 198/460.2 |
| 5,547,004 | A * | 8/1996 | Fransen | 198/460.2 |
| 6,305,525 | B1 * | 10/2001 | Miller et al. | 198/460.2 |
| 6,341,685 | B1 * | 1/2002 | Spatafora et al. | 198/460.2 |
| 6,640,961 | B2 * | 11/2003 | Cavallari | 198/460.2 |
| 7,455,168 | B2 * | 11/2008 | Monti | 198/460.2 |
| 2002/0005333 | A1 | 1/2002 | Mondie et al. | |
| 2003/0196871 | A1 | 10/2003 | Jones, Jr. | |

FOREIGN PATENT DOCUMENTS

| | | |
|---|---|---|
| EP | 0485845 A1 | 4/1991 |
| EP | 0919494 A1 | 6/1999 |
| FR | 2748461 A1 | 11/1997 |
| JP | 6024545 A | 2/1994 |

OTHER PUBLICATIONS

PCT International Search Report; International Application No. PCT/EP2013/0011638; International Filing Date: Apr. 19, 2013; Applicant: Marel Iceland Ehf; Date of Actual Completion of International Search: Jun. 3, 2013; Date of Mailing of International Search: Jul. 6, 2013.

* cited by examiner

CONVEYOR SYSTEM AND A METHOD FOR PRODUCING A SEQUENCE OF DISCRETE FOOD ITEMS FROM A PLURALITY OF INCOMING FOOD OBJECTS

CROSS-REFERENCES TO RELATED APPLICATIONS

This application is the national phase of International Application No. PCT/EP2013/001168 filed on Apr. 19, 2013, which claims the benefit of priority to European Patent Application No, EP12002755.2 filed on Apr. 19, 2012 and U.S. Patent Application No. 61/635,375 filed on Apr. 19, 2012. The entire disclosures thereof are incorporated herein by reference.

FIELD OF THE INVENTION

The present invention relates to a conveyor system and a method to produce a sequence of discrete food items from a plurality of incoming food objects where the sequence of discrete food items fulfills a pre-determined distance criterion.

BACKGROUND OF THE INVENTION

In the food industry today it can sometimes be of outmost importance to ensure that food items that are being conveyed form a sequence where the distance between adjacent food items is suitable for subsequent processing step. As an example, robots that are being implement today for generating batches of pre-fixed target weight of two or more food items require that a minimum distance is present between adjacent food items in order to work in the most optimal way and maximize the throughput. If this distance is below or above this limit the throughput of the robots and thus the processing is reduced. Another example is grading of food items into multiple of bins, where certain minimum distance must be present between the food items so that the mechanical arms that are associated with the conveyor systems can redirect the items passing by on the conveyer belt to the appropriate receiving bins.

A common solution to solve the above mentioned problem is to implement two conveyor belts with fixed ends that are running with different speeds so that the conveyed food items become accelerated along the conveyor belt. FIG. 1 shows a scenario where a first conveyor 101 and a second conveyor 102 are running with different speeds where v2>v1 and the incoming food items 103-105 have different lengths. At the interface between the first conveyor 101 and the second conveyor the acceleration causes that the distances between the items is increased as shown in FIG. 1b.

The drawback with this method is that in case the length of the items is different as shown here it will not be possible to ensure even distances between the food items on the second conveyor 102. The distance d1 may be the most preferred distance i.e. that maximizes the throughput in the subsequent processing steps, whereas distance d2 is too long and causes a time delay in the subsequent processing step and thus reduces the throughput in the process.

Also, in case of two or more batches as depicted in FIG. 2, the space d1 between two batches shown in FIG. 2a will be increased to a distance d2>d1, which again results in an increased waiting time for the subsequent processing steps.

US 2003/0196871 discloses a device to correct uneven spacing of successive articles, where the device is capable of taking a single row of unevenly spaced articles on a first conveyor and ensure that the articles are more evenly spaced or more evenly stacked on a second conveyor. This is done by moving a noser of a first conveyor upstream or downstream so that the point of arrival for an article on a second conveyor may be moved upstream or downstream, thereby correcting the spacing of the articles on the second conveyor belt. As an example, the device can be implemented for any process where there is a shingling or stacking operation of e.g. cookies or crackers, causing the articles to overlap or shingle on the second conveyor belt. The first and the second conveyor belts may also be on the same level if the aim is change items that are unevenly on the first conveyor to become uniformly spaces them on the second conveyor without stacking.

There are however situations where the disclosure of US 2003/0196871 fails. This is as an example where food items such as fish fillets undergo a cutting process where a fish fillet is cut into several pieces that are lying next to each other, and where there is some distance, e.g. on average 30 cm, between adjacent fish fillets and where the requirement is to make an even distribution of the pieces with e.g. 5 cm distance there between. This may be of outmost importance where a subsequent packaging is performed by e.g. robots where such a spacing is the minimum spacing needed so that the robot arm has sufficient space to take only one piece at a time and to place is it a container. If the spacing is more than 5 cm the throughput/speed of the robot(s) will not be fully used and thus the throughput of the packing process will be reduced.

FR 2748461 A discloses a method and a device for transferring items such as biscuits from an infeed carrier to an outfeed carrier. The carriers are positioned one after the other and adapted to form a junction therebetween, which is borne by an upper mobile carriage in order to provide a variable transition front for the items. Both of these carriers are continuous carriers, guided by a set of deflection and/or tensioning rollers, and furthermore a lower mobile carriage is utilized for guiding the carriers. The two mobile carriages are connected by a continuous chain device, comprising two continuous chains and corresponding deflection pulleys or wheels placed lateral on either side of the carriages, whereby the upper and the lower mobile carriages are moved simultaneously by equal distances, but in opposite directions, when the variable transition front between the infeed carrier and the outfeed carrier is moved.

Due to the laterally disposed continuous chain device for moving the two mobile carriages, this prior art method and device implies a spacious and relatively complex arrangement. Furthermore, due to this space demand, such a prior art device will not be suitable for arranging two or more devices next to each other, e.g. in processing plants, etc.

Moreover, this device is designed for light items such as biscuits, where the carrying capacity is limited to the conveyor belt tension meaning that the more carrying capacity that is needed the more thick must the conveyor belt need to be. This would obviously be reflected in that the width of the transition front of the transfer system, between the two wheels, will be larger if the belt is larger. However, if the incoming food products are relative thin and/or bendable, e.g. fish fillet pieces, they can easily get stuck at the transition or simply fall down there between.

The inventor of the present invention has appreciated that there is thus a need for a conveyor system that is capable of converting uneven distances of incoming food items or batches to controlled distances such as even distances so as to optimize subsequent processing steps and thus maximize the throughput of the process and has in consequence devised the present invention.

SUMMARY OF THE INVENTION

It would be advantageous to achieve an improved conveyor system and a method that is capable of receiving incoming food items or batches, especially relative heavy food items such as fish fillets, and deliver a sequence of food items that fulfills pre-fixed distance criterion, e.g. such that the distances between the items are equal and within certain range and in that way optimized subsequent processing steps. In general, the invention preferably seeks to mitigate, alleviate or eliminate one or more of the above mentioned disadvantages singly or in any combination. In particular, it may be seen as an object of the present invention to provide a conveyor system that solves the above mentioned problems, or other problems, of the prior art.

To better address one or more of these concerns, in a first aspect of the invention a conveyor system is provided for producing a sequence of discrete food items from plurality of incoming food objects conveyed by an in-feed conveyor belt, each of the incoming food objects including at least one food item, where the distance between adjacent food items of said sequence of discrete food items fulfills a pre-determined distance criterion, said conveyor system comprising:
- a first conveyor belt, where an upstream end of said first conveyor belt is placed adjacent to a downstream end of said in-feed conveyor belt forming a first set of adjacent conveyor belt ends,
- a second conveyor belt, where an upstream end of said second conveyor belt is placed adjacent to a downstream end of said first conveyor belt forming a second set of adjacent conveyor belt ends connected together via a junction, wherein said first conveyor belt and said second conveyor belt are closed loop belts, which furthermore are connected via a lower junction, positioned below the surface of said first conveyor belt and said second conveyor belt, said junction and said lower junction being connected via a set of tooth belts extending between the junction and the lower junction via a roller located below the first conveyor belt and a roller located below the second conveyor belt,
- an imaging mechanism for imaging said incoming food objects so as to obtain image data including image data indicating the length of the incoming food objects and distances between adjacent incoming food objects,
- a control unit adapted to operate a back and forth movement of said second set of adjacent conveyor belt ends while maintaining the internal position of the adjacent conveyor belt ends fixed and thus adjust the active length of the first conveyor belt, said control unit being configured for operating said back and forth movement of said second set of adjacent conveyor belt ends via said set of tooth belts connecting said junction and said lower junction, wherein said first conveyor belt acts as a buffer for collecting at least one of said incoming food objects from said in-feed conveyor belt, and where said control unit operates the delivering of said at least one collected food objects to said second conveyor belt via controllable movement of said second set of adjacent conveyor belt ends based on said image data.

The term food object may stand for a single piece of a food item such as a fish fillet, a piece of meat muscle, poultry breast etc. The term food object may also stand for several food items which may e.g. form fixed portions, such as 5 cm long fish fillet/meat portions or 80 g fish fillet/meat portions that are so close together that the processing of the image data interprets them as a single piece of item.

Accordingly, a conveyor system is provided that is capable of providing a sequence of discrete food items in a controllable way. The speed of the in-feed and the second conveyors may be equal at all times or the speeds may be different.

Moreover, the fact that the first conveyor belt acts as a buffer conveyor belt it is now possible to supply a sequence of discrete food items out of incoming food objects where the incoming food objects constitute a plurality of objects, e.g. said fish fillet/meat portions that has undergone a cutting process. This could e.g. be the case where a food object is a fish fillet that has been cut into two or more pieces that are lying next to each other where the distance between the adjacent fish fillets (food objects) is 30 cm. In such situations, this distance between the adjacent fish fillets (objects) is distributed between the food items on the second conveyor belt, such that it fits to a subsequent processing step, which may e.g. be putting the food items into trays be robot(s).

Even further, due to the arrangement of the toothed belts and corresponding rollers below the surface of the first and second conveyor belts, e.g. with the toothed belts and corresponding rollers positioned within the closed loops of the first and second conveyor belts, a compact and expedient configuration of the conveyor system can be provided. Hence, the capacity of such a processing system may be enlarged in an expedient manner by placing two or more conveyor systems according to the invention right next to each other without taking up an unnecessary amount of space. Also, since the toothed belts connecting the junctions and the corresponding rollers are positioned below the surface of the first and second conveyor belts, these toothed belts and/or the corresponding rollers may serve as support for the first and/or the second conveyor belts, meaning that the conveyor system may expediently be used for processing heavier items without e.g. the conveyor belts sagging, etc., which might otherwise influence the precision of the handling of the objects and items. This also makes it possible to use very thin conveyor belts since the support comes more or less from the toothed belts and therefore the distance between the first and the second conveyor belt ends together via said junction can be very narrow, in the range of few millimeters. There is thus no risk that food items will get stuck there between during the transfer from the first conveyor belt to the second conveyor belt.

In one embodiment, said control unit is further adapted to operate a back and forth movement of said first set of adjacent conveyor belt ends based on said image data (322).

In one embodiment, said incoming food objects are multiple of batches each of which includes two or more food items, said image data further including the length of said food items within the batches.

In one embodiment, said collecting at least one of said incoming food objects onto said first conveyor belt is operated by said control unit and comprises, upon arrival of a first batch at the first conveyor belt:
- advancing the second set of adjacent conveyor belt ends with a speed matching the speed of the first conveyor belt from a contracted position towards an extended position, where the length between the extended position and the contracted position substantially matches the length of said first batch, said delivering including
- advancing the second set of adjacent conveyor belt ends back to the contracted position and adjusting the speed of the first conveyor belt such that it becomes less that the speed of the second conveyor belt, the speed of the second set of adjacent conveyor belt ends back to said contracted position being selected such that upon arrival at the contracted position a second batch has arrived at the first conveyor belt.

Assuming that the batch is a fish fillet that has been cut into three pieces, the length between the extended position and the contracted position of the first conveyor belt will substantially match the total length of this fish fillet. By advancing the first conveyor belt with the same speed as the junction the fish fillet will be standing still if the frame of reference is the first conveyor belt. By advancing the junction in a controllable way back towards the contracted position, and at the same time adjust the speed of the first conveyor belt such that it becomes less than the speed of the second conveyor belt, the fish fillet items will be delivered at the second conveyor belt as a sequence of pieces that fulfill said pre-determined distance criterion. At the same time it will be ensured that when the first conveyor belt reaches the contracted position the subsequent batch has just reached the first conveyor belt, and the process is then repeated. Accordingly, the distances between the batches will be distributed between the fish items on the second conveyor belt.

The pre-determined criterion may as an example be, but is not limited to, fixed distances between adjacent items, or fixed front-to-front distances between adjacent items. The front-to-front distances may be of relevance because e.g. the capacity of a weighing device and a robot is limited, i.e. if the items are very short it may not be sufficient that the spaces between the items are adjusted to the minimum distance for the robot. Also, the pre-fixed distance may be a repetition pattern-based distances, e.g. two-and-two pieces that are lying next to each other with a fixed distance between adjacent said two-and-two pieces.

In one embodiment, said advancing of the second set of adjacent conveyor belt ends back to the contracted position is adapted to the length of said food items within the batches such that the delivering of said at least one collected food objects to said second conveyor belt results in a sequence of discrete food items that fulfills said pre-determined distance criterion. Accordingly, it is possible to receive a batch, e.g. said fish fillet that has been cut into three pieces of different length, and output the fish fillet onto the second conveyor as a sequence of three discrete pieces with a fixed distance there between, irrespective of the different length of the fish pieces. Thus, if the pre-fixed criterion is that the distance between adjacent food items is 8 cm, it will be ensured that this distance remains fixed between the fish pieces, irrespective of whether a first fish piece is 20 cm, a second fish piece is 15 cm and the third fish piece is 10 cm. This means that the second set of adjacent conveyor belt ends will move faster back for the longest item compared and slowest for the shortest fish piece.

In one embodiment, said incoming food objects are multiple of discrete food items, wherein collecting at least one of said incoming food objects onto said first conveyor belt is operated by said control unit and comprises, upon arrival of a first food item at the first conveyor belt, a) advancing the second set of adjacent conveyor belt ends with a speed matching the speed of the first conveyor belt from a contracted position towards an extended position, the length between said contracted position and said extended position substantially matching the length of said first food item,
b) halting the second set of adjacent conveyor belt ends and the first conveyor belt until a second food item arrives at the first conveyor belt and repeating step a) for said second food item,
c) continuing steps a) and b) for at least one subsequent item.

Accordingly, this may be considered as the very first step when starting the operation of the conveyor system, where the first conveyor belt accumulates several food items.

In one embodiment, said collecting and/or delivering said at least one collected food objects to said first conveyor belt and/or said second conveyor belt is synchronized to the internal position of the incoming food items such that collecting said food items from the in-feed conveyor belt onto the first conveyor belt is triggered as soon as a food item arrives at the first conveyor belt, where in-between the delivering of said at least one collected food item from said first conveyor belt to said second conveyor belt is triggered via movement of the second set of adjacent conveyor belt ends towards said contracted position. Accordingly, via this interplay of collecting food items on the first conveyor belt and delivering food items from the first conveyor belt onto the second conveyor belt, it is ensured that the waiting time between adjacent incoming food items on the in-feed conveyor is used to deliver the food items onto the second conveyor, since otherwise this waiting time would result in an uneven distribution of the food items on the second conveyor belt. As an example, assume that there is a 10 cm space between the incoming food items on the in-feed conveyor and that one of the food items has arrived at the first conveyor belt. This first food item will be moved onto the first conveyor belt via advancing the junction and the first conveyor belt at equal speed towards an extended position that matches the length of this incoming food item, i.e. the advancing from the contracted position towards the extended position matches the length of the food item. Instead of halting the junction and the speed of the first conveyor belt until the next food item arrives, which would obviously increase the space of the food items on the second conveyor belt (assuming it is running at constant speed), this time is utilized to deliver food items from the first conveyor belt to the second conveyor belt via moving the junction back towards an contracted position. Depending on the waiting time between adjacent food items on the in-feed conveyor belt, one or more food items may in this time frame may be delivered to the second conveyor. Accordingly, the back and forth advancing of the second set of adjacent conveyor belt ends and the first conveyor belt is controlled based on image data indicating the internal position of the incoming food items and the length of the incoming food items.

In a second aspect of the invention a method is provided for producing a sequence of discrete food items from plurality of incoming food objects conveyed by an in-feed conveyor belt, each of the incoming food objects including at least one food item, where the distance between adjacent food items of said sequence of discrete food items fulfills a pre-determined distance criterion, said method comprising:

imaging said incoming food objects to obtain image data including image data indicating the length of the incoming food objects and distances between adjacent incoming food objects, conveying at least one of said incoming food objects onto a first conveyor belt, where an upstream end of said first conveyor belt is placed adjacent to a downstream end of said in-feed conveyor belt forming a first set of adjacent conveyor belt ends, the first conveyor belt acting as a buffer for collecting at least one of said incoming food objects from said in-feed conveyor belt, where an upstream end of a second conveyor belt is placed adjacent to a downstream end of said first conveyor belt forming a second set of adjacent conveyor belt ends, said second set of adjacent conveyor belt ends being connected together via a junction, wherein said first conveyor belt and said second conveyor belt are closed loop belts, which furthermore are connected via a lower junction, positioned below the surface of said first conveyor belt and said second conveyor belt, said junction and said lower junction being connected via a set of tooth belts extending between the junction and the lower junction via a roller located below the first conveyor belt and a roller located below the second conveyor belt.

controlling by a control unit back and forth movement of said second set of adjacent conveyor belt ends, while maintaining the internal position of the adjacent conveyor belt ends fixed, and thus adjust the active length of the first conveyor belt, said control unit being configured for operating said back and forth movement of said second set of adjacent conveyor belt ends via said set of tooth belts connecting said junction and said lower junction, wherein the controlling includes controlling the delivering of said at least one collected food objects onto said second conveyor belt via controllable movement of said second set of adjacent conveyor belt ends based on said image data.

In one embodiment, in said method said incoming food objects are multiple of batches each of which includes two or more food items, said image data further including the length of said food items within the batches, said step of collecting at least one of said incoming food objects onto said first conveyor belt is operated by said control unit and comprises, upon arrival of a first batch at the first conveyor belt, advancing the second set of adjacent conveyor belt ends with a speed matching the speed of the first conveyor belt from a contracted position towards an extended position, where the length between the extended position and the contracted position substantially matches the length of said first batch, said delivering including advancing the second set of adjacent conveyor belt ends back to the contracted position and adjusting the speed of the first conveyor belt such that it becomes less that the speed of the second conveyor belt, the speed of the second set of adjacent conveyor belt ends back to said contracted position being selected such that upon arrival at the contracted position a second batch has arrived at the first conveyor belt.

In one embodiment, in said method said advancing of the second set of adjacent conveyor belt ends back to the contracted position is adapted to the length of said food items within the batches such that the longer the food items are the faster is the speed of the second set of adjacent conveyor belt ends such that the delivering of said at least one collected food objects to said second conveyor belt results in a sequence of discrete food items that fulfills said pre-determined distance criterion.

In one embodiment, in said method during said collecting of at least one of said incoming food objects the speed of the second set of adjacent conveyor belt ends and the first conveyor belt are larger than the speed of the in-feed conveyor belt. Accordingly, assuming that the batch is said fish fillet that has been cut into three fish pieces, it will be accelerated at the interface between the in-feed conveyor and the first conveyor and space will be produced between the pieces already at the first conveyor. However, since the length of the pieces may not be the same this space will not be equal. The controlled movement of the junction may thus be such that said pre-determined distance criterion will be fulfilled, e.g. to level out different distances of the fish pieces to that the sequence of fish items on the second conveyor has fixed distance of e.g. 8 cm.

In another embodiment, during said collecting of at least one of said incoming food objects the speed of the second set of adjacent conveyor belt ends and the first conveyor belt are equal to the speed of the in-feed conveyor belt. Continuing with said example of the fish fillet, this would be the scenario where the fish fillet is transferred smoothly from the in-feed conveyor belt to the first conveyor belt and where the spacing between the fish pieces is generated when the second set of adjacent conveyor belts ends is moved back towards said contracted position and where the advancing is adapted to the length of the fish pieces such that the resulting sequence on the second conveyor fulfills said pre-determined distance criterion.

In one embodiment, in said method said incoming food objects are multiple of discrete food items, wherein collecting at least one of said incoming food objects onto said first conveyor belt is operated by said control unit and comprises, upon arrival of a first food item at the first conveyor belt, a) advancing the second set of adjacent conveyor belt ends with a speed matching the speed of the first conveyor belt from a contracted position towards an extended position, the length between said contracted position and said extended position substantially matching the length of said first objects, b) halting the second set of adjacent conveyor belt ends and the first conveyor belt until a second food item arrives at the first conveyor belt and repeating step a) for said second item, c) continuing steps a) and b) for at least one subsequent item.

In one embodiment, in said method the collecting and/or delivering of said at least one collected food objects to said first conveyor belt and/or said second conveyor belt is synchronized to the internal position of the incoming food items such that collecting said food items from the in-feed conveyor belt onto the first conveyor belt is triggered as soon as a food item arrives at the first conveyor belt, where in-between the delivering of said at least one collected food item from said first conveyor belt to said second conveyor belt is triggered.

In a third aspect of the invention a computer program is provided comprising instructions for carrying out the steps of said method when said computer program is executed on a suitable computer device In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1A:
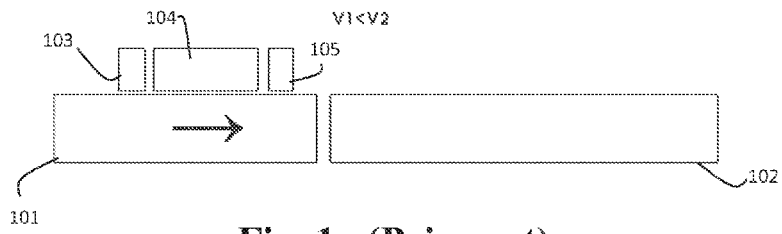
FIGS. 1 and 2 show examples of prior art conveyor system for producing a sequence of discrete food items from plurality of incoming food items.
Figure 1B:
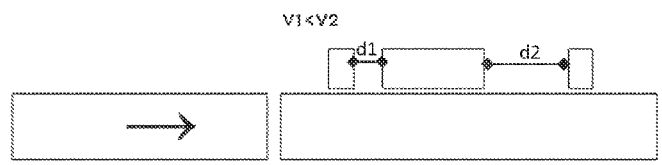
Figure 2A:
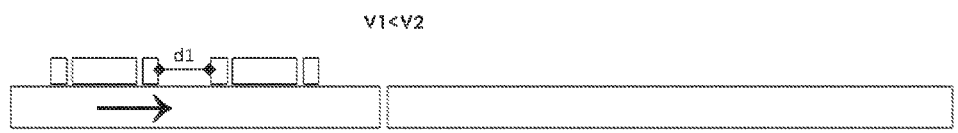
Figure 2B:
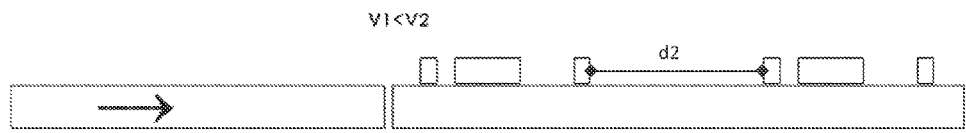

Figure shows an embodiment of a conveyor system 300 according to the present invention for producing a sequence of discrete food items from plurality of incoming food objects conveyed by an in-feed conveyor belt 321, each of the incoming food objects including at least one food item, such that the distance between adjacent food items of said sequence of discrete food items fulfills a pre-determined distance criterion. The pre-determined distance criterion may be, but is not limited to, fixed distances between adjacent food items or fixed front-to-front distances between adjacent food items, or any type of distance pattern that may e.g. be preferred for a subsequent processing step.

The conveyor system 300 comprises a rotor 304, a control unit 319, an imaging mechanism 320, which may as an example be, but is not limited to, a digital camera or a laser vision, a first conveyor belt 301 placed downstream to the in-feed conveyor belt 321 and form a first set of adjacent conveyor belt ends, a second conveyor belt 302 placed downstream to the first conveyor belt 301 and form a second set of conveyor belt ends, where the second set of conveyor belt ends is operated by the control unit 319 for allowing a controllable back and forth movement of second set of conveyor belt ends.

The control unit may be any type of a computer device that contains a computer program comprising instructions for carrying out the controlling of back and forth movement of the second set of conveyor belt end when said computer program is executed on a suitable computer device.

As depicted here, the adjacent ends of the first and second conveyors belts 301, 302 are operable connected together via a junction 303 for remaining their internal position fixed at all times. The junction 303 is slidable mounted to a first set of rail structure 317, 318 and is operated by the control unit 319 which operates back and forth movement of the junction 303 and therefore the active length of the first conveyor belt 301. As depicted here, a further junction 315 is provided slidable mounted to a second rail structure 316 positioned below the surface level of the first and a second conveyor belts 301, 302 for remaining the second ends of the first and second conveyor belts also fixed at all times.

The conveyor system 300 further comprises first set of fixed idle rollers 305-308 associated to the first conveyor belt and a second set of fixed idle rollers 310, 312-314 associated to the second conveyor belt. A first set of tooth belts 323 (shown in FIG. 3) is associated to the first conveyor belt and extends between the junction 303 and the further junction 315, to which they are mounted, and the first set of idle rollers 305-308 and the rotor 304 (with roller 325), which supplies the back and forth driving force for the tooth belts and which is controlled by the control unit. Similarly, a second set of tooth belts 324 (shown in FIG. 3) extends between the junction 303 and further junction 315, to which they are mounted, and the second set of idle rollers 310, 312-315. The first and the second sets of tooth belts 323, 324 act thus in a way as a single set of tooth belts for synchronize the movement of the two junctions 303, 315 together such that a back and forth movement of the junction 303 controlled by the control unit 319 becomes simultaneously transferred to an opposite movement of the second junction 315, while maintaining the tension of the first and the second conveyor belts 301, 302 fixed at all times.

Shown are also two drive rollers (rotors) 309, 310, a drive roller 309 associated to the first conveyor belt 301 driving the first conveyor belt 301, and a second roller 311 associated to the second conveyor belt 302 for driving the second conveyor belt. The driving speed of the first and the second conveyor belts 301, 302, may be controllable by e.g. said control unit 319. As shown here, the driving rollers 309, 311 have outwardly protruding pins 330, 331, for engaging with holes (not shown) on the opposite sides of the first and second conveyor belts, respectively.

The imaging mechanism 320 provides image data 322 for the incoming objects including image data indicating the length of the incoming objects and distances between adjacent incoming objects. As will be discussed in more details in relation to FIGS. 5-6, the image data 322 is used by the control unit 319 to operate the back and forth movement of the junction 303, i.e. firstly to utilize the first conveyor 301 as a buffer for collecting at least one of the incoming food objects from the in-feed conveyor 321, and secondly to operate the delivering of the at least one collected food objects to the second conveyor 302 via controllable advancing of the junction 303 from an extended position towards a contracted position.

Figure 3:
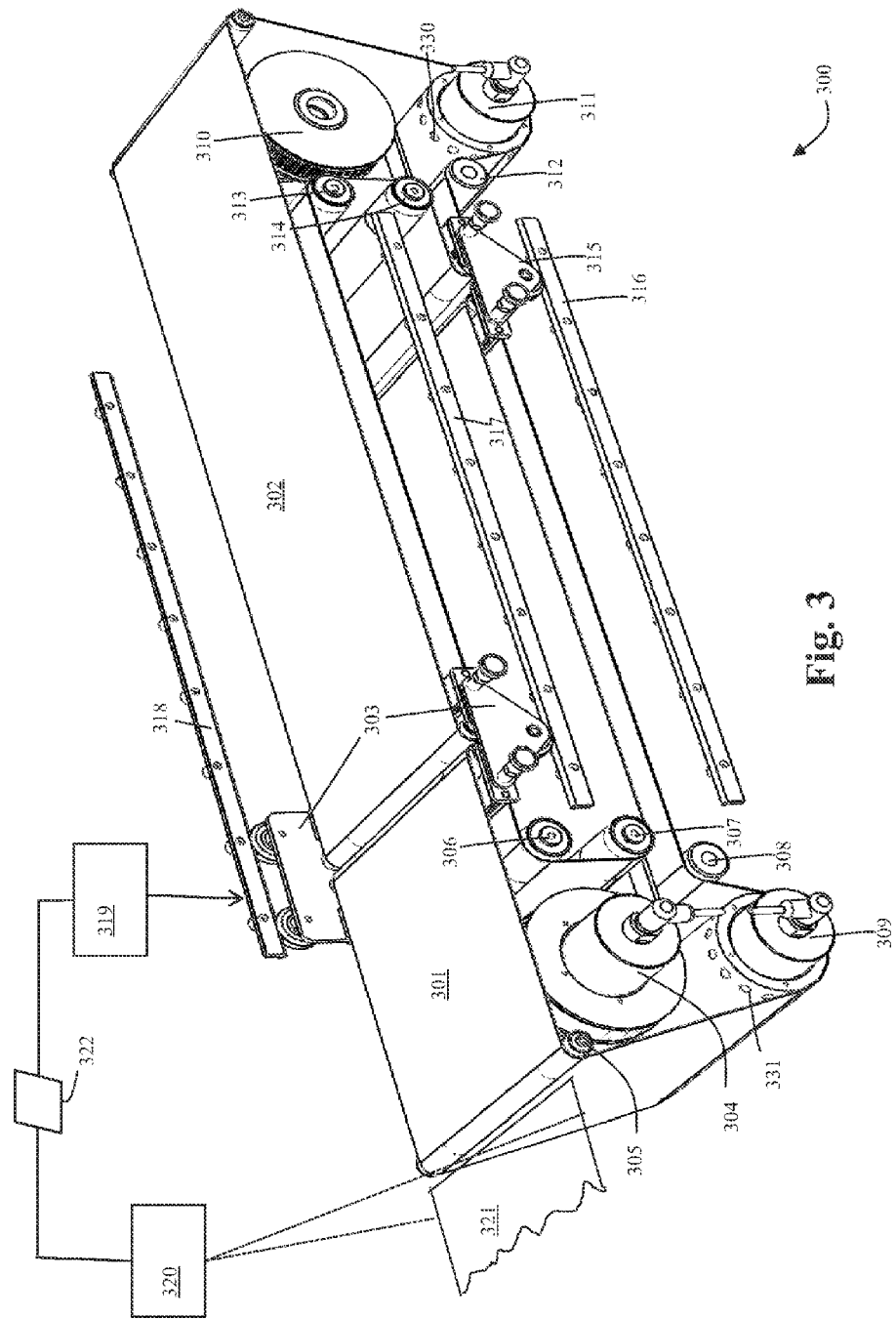
FIG. 3 shows an embodiment of a conveyor system according to the present invention for producing a sequence of discrete food items from plurality of incoming food objects.
Figure 4A:
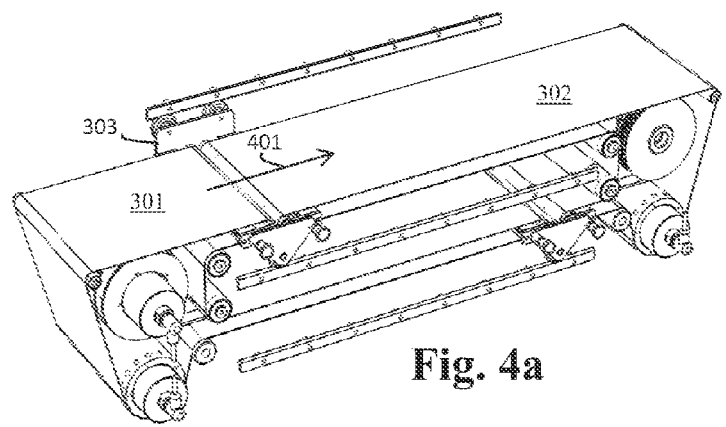
FIG. 4*a-c* shows the conveyor system in FIG. 3 where the first conveyor belt moves from being in a contracted position towards an extended position.
Figure 4B:
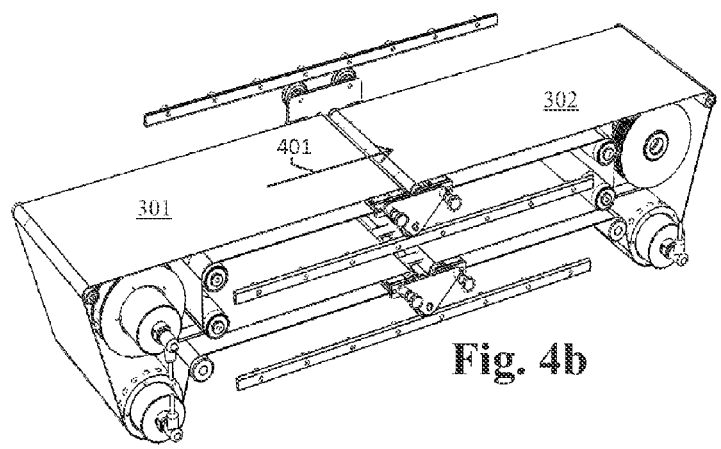
Figure 4C:
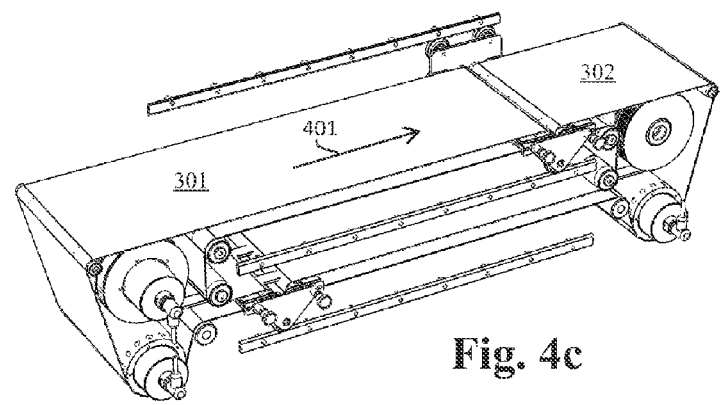

FIG. 4a-c shows the conveyor system in FIG. 3 in three different positions, a first position where the first conveyor belt 301 is in a contracted position (FIG. 4a), and the two other positions being where the length of the first conveyor belt 301 is increased via linear movement of the junction 303 towards two extended position (FIGS. 4b and 4c). The conveying directions of the items/objects are indicated by the arrow 401.

The term "contracted position" and "extended position" should not be construed as being the shortest and longest length of the first conveyor belt but should simply reflect that the active length of the first conveyor belt 301 is being increased or decreased.

Figure 5A:
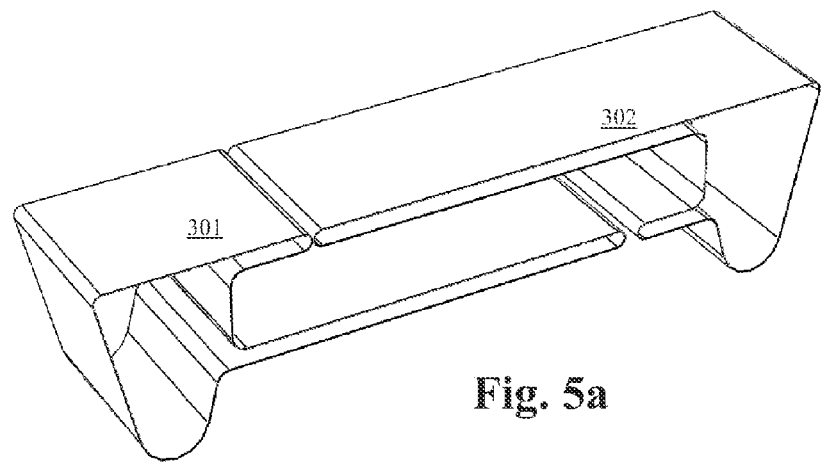
FIG. 5*a-c* shows, for further clarification, the shape of the first and the second conveyor belts FIG. 4*a-c,*
Figure 5B:
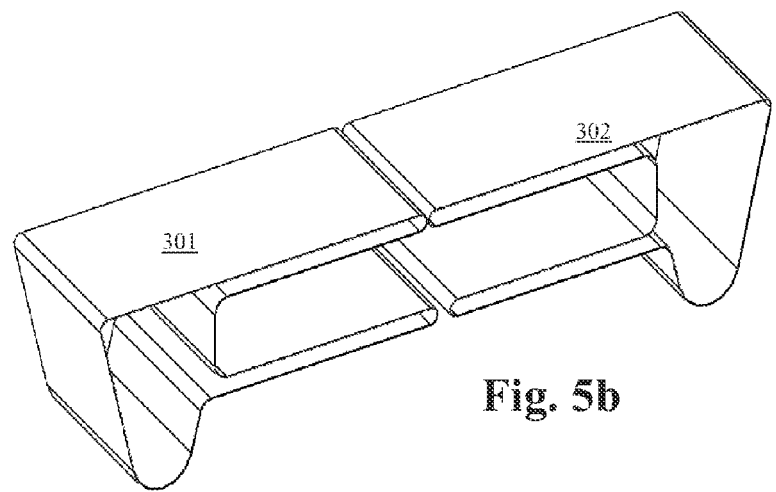
Figure 5C:
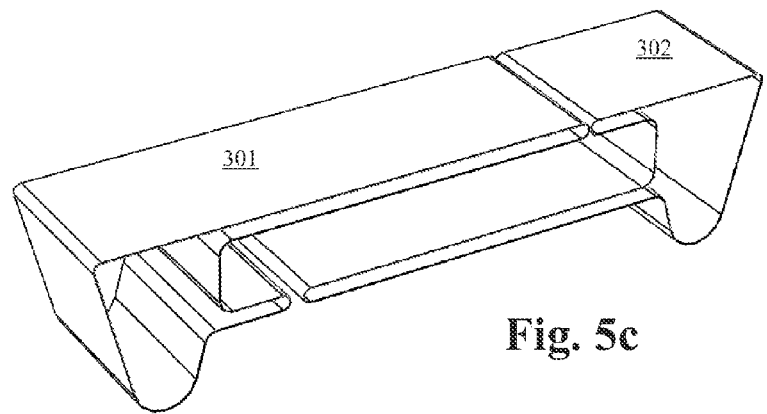

FIG. 5a-c shows, for further clarification, the shape of the first and the second conveyor belts 301, 302 in FIG. 4a-c from where the first conveyor belt is in a contracted position and is moved towards said two extended positions.

Figure 6A:
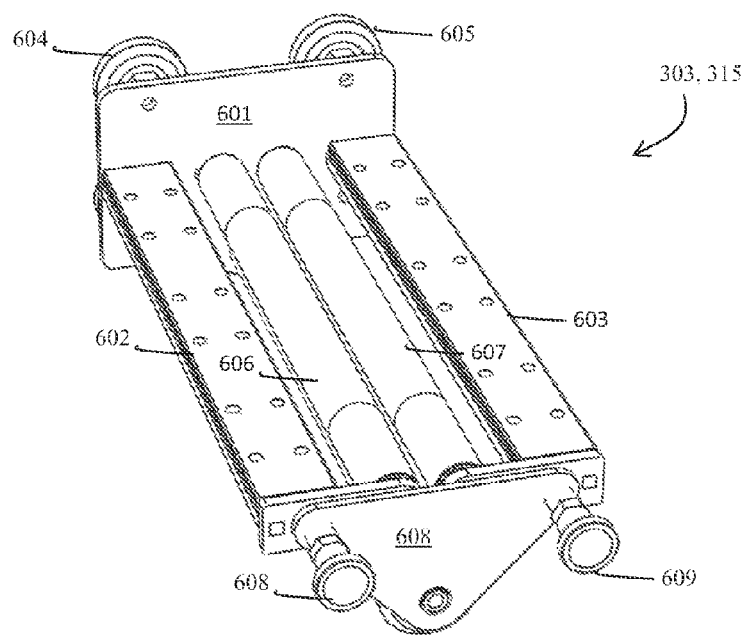
FIG. 6*a,b* shows one embodiment of a junction to be implemented in said conveyor system.
Figure 6B:
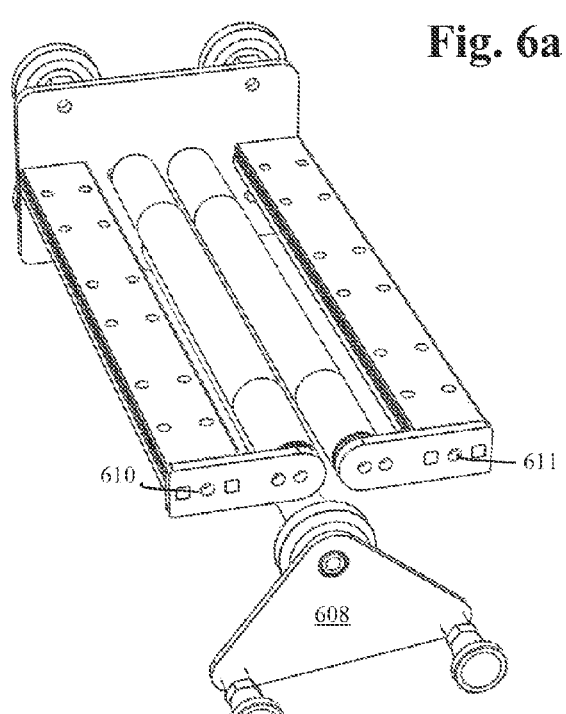

FIG. 6a,b shows one embodiment of a junction 303, 315 to be implemented in said conveyor system 300, comprising a base plate 601, two parallel elongated beams 602, 603 that are rigidly mounted to the base plate 601 e.g. via welding to which said tooth belts may as an example be mounted to, and parallel rollers 606, 607 around which the first and the second conveyor belts 301, 302 extend. An end plate structure 608 provides an opposite support to the base plate 601 via the handles 608, 609 comprising pins (not shown), which provide a locking and un-clocking function (see FIG. 6b) via connection/un-connecting the pins and the holes 610, 611. This opening and closing function of the opposite plate structure 608 allows removing the first and second conveyor belts e.g. for cleaning purposes or for replacing the conveyor belts with new ones. The wheels 604, 605 engage with said rail structures 316-318 for enabling said back and forth sliding of the junction 303, 315.

Figure 7:
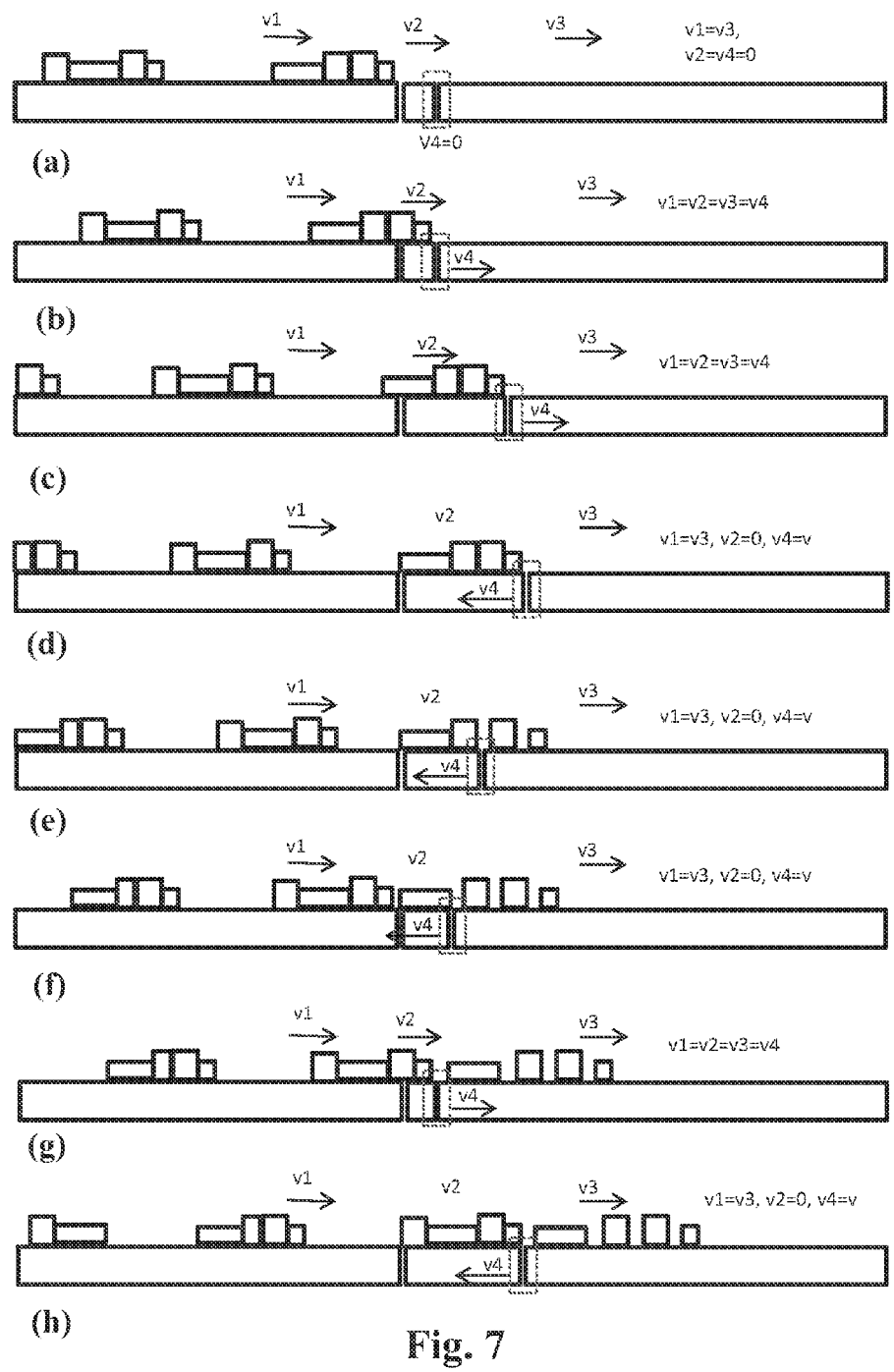
FIG. 7 shows on embodiment of producing a sequence of discrete food items from plurality of incoming food objects.

FIG. 7 depicts graphically one embodiment of conveyor system according to the present invention for producing a sequence of discrete food items from plurality of incoming food objects, where the incoming food objects are multiple of batches each of which contains four food items.

Figure 8:
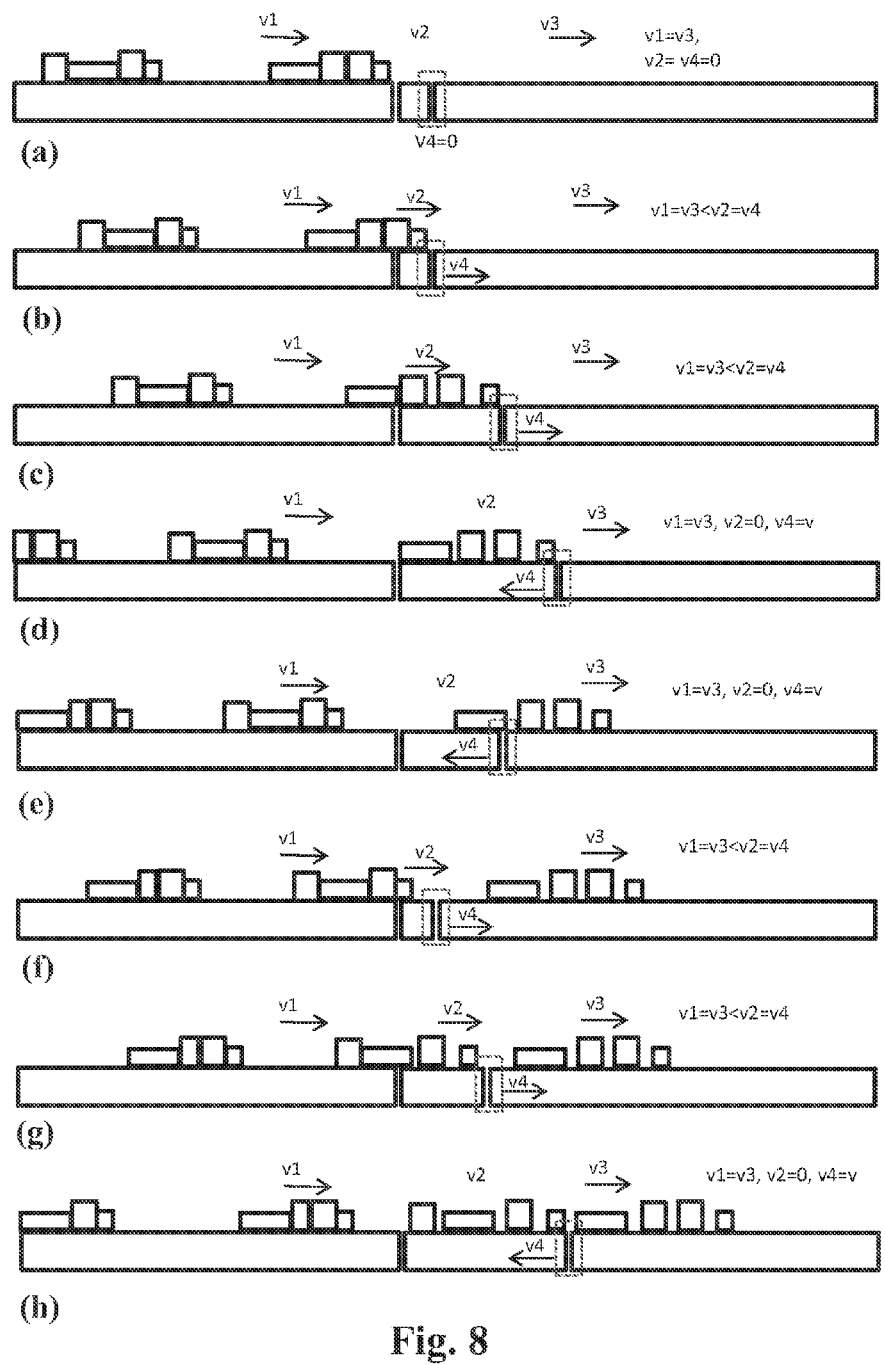
FIG. 8 shows another embodiment of producing a sequence of discrete food items from plurality of incoming food objects.
Figure 9:
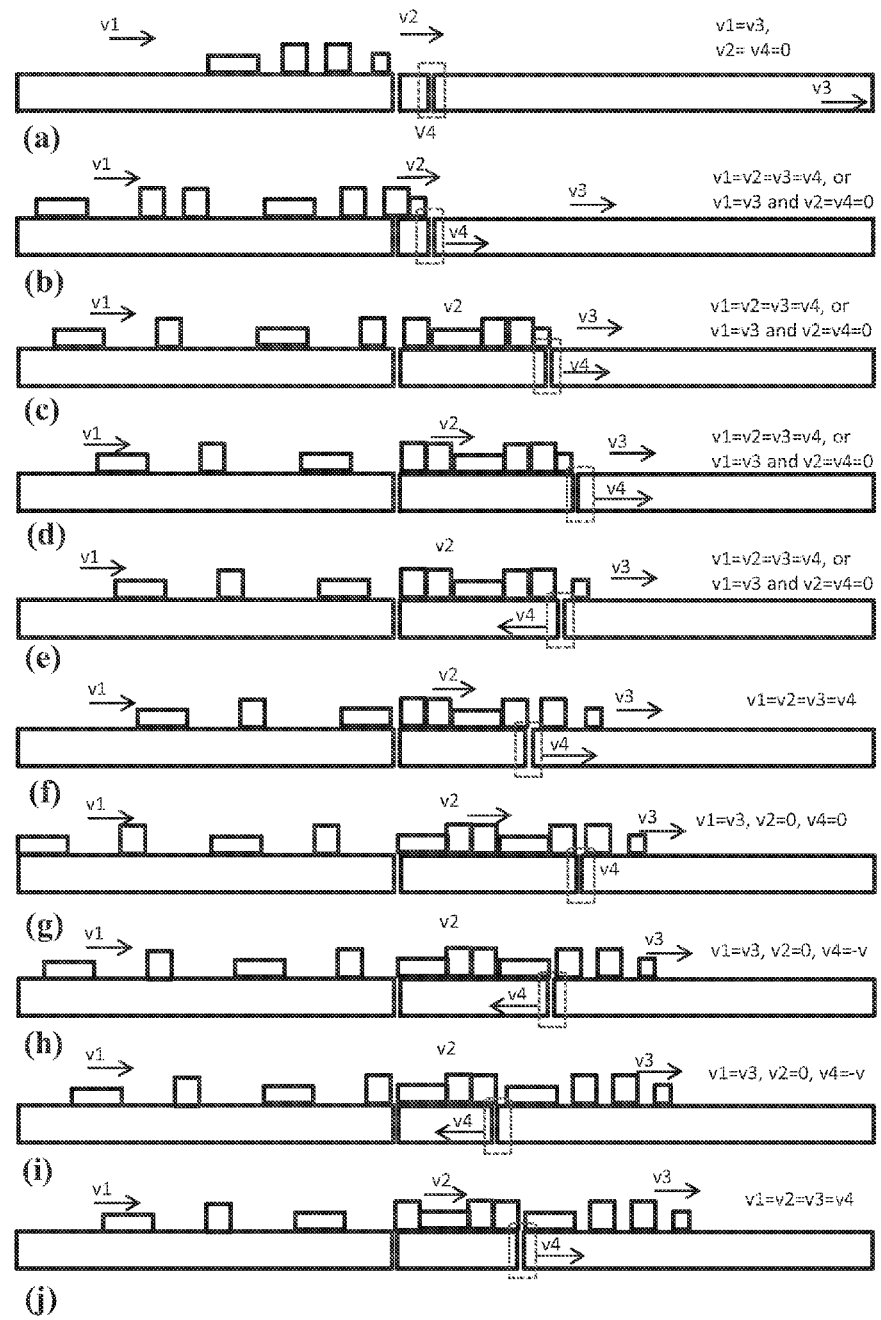
FIG. 9 shows yet another embodiment of producing a sequence of discrete food items from plurality of incoming food objects.

In the embodiment in FIG. 7 and also in the embodiments in FIGS. 8-9 the following applies:
- v1=speed in-feed conveyor,
- v2=speed first conveyor,
- v3=speed second conveyor, and
- v4=speed junction.

Referring to the embodiments in FIG. 7, v3≥v1 and both the in-feed and the second conveyor belts are running continuously. For simplicity it will be assumed that v3=v1.

As will be discussed in more details below, v2=v3 and v4=v3 when the batches on the in-feed conveyor belt are transferred to the first conveyor belt. Further, when the batches are delivered from the first conveyor belt to the second conveyor belt, it will be assumed that v2=0 and v4=−v.

Since the incoming objects are batches consisting of two or more food items the imaging further includes imaging the length of the food items within the batches.

FIG. 7a shows where first batch approaches the first conveyor belt, which is in a contracted position. At this time point, the speed v2 of the first conveyor belt and the speed v4 of the junction is zero. As soon as it arrives at the first conveyor the speed v2 of the first conveyor belt and the speed of the junction v4 are started and set to a speed value equal to the speed of the in-feed conveyor belt and the second conveyor belt, i.e. v1=v2=v3=v4 (see FIG. 7b). Since the speed of the junction v4 and the first conveyor belt v2 are the same the internal position of the first batch is the same at all times, i.e. the front end of the first batch is adjacent to the second conveyor belt during this advancing. Or put in other words, if the frame of reference is the first conveyor belt the first batch is standing still.

The advancing of the junction from the contracted position to the extended position is continued (see FIG. 7c) until the length between the extended position and the contracted position substantially matches the length of the first batch (FIG. 7d). Upon reaching this extended position, the speed v2 of the second conveyor belt is stopped (or reduced) and the advancing v4 of the junction back towards the contracted position starts. The fact that the length of the food items within this first batch has different lengths means that the speed v4 of the junction back to the contracted position must be adjusted accordingly so as to fulfill said pre-defined distance criterion. Assuming that the distance criterion is a sequence of food items with the same distance between would mean that the speed of the junction must accordingly move faster when delivering longer food items onto the second conveyor belt compared to shorter food items. As shown here, this means that the speed v4 of the junction when delivering the first food item onto the second conveyor belt (see FIG. 7e) must be less than when the junction is delivering the last food item of this first batch (see FIG. 7e,f). Further to this, the average speed v4 of the junction is preferably such that upon arrival at the contracted position (see FIG. 7f) the second incoming batch has arrived at the first conveyor belt (FIG. 7f). This process is now repeated, i.e. the speed of the first conveyor belt v2 and the speed of the junction v4 are set to the same value (see FIG. 7g) and this second batch is transferred onto the first conveyor belt (see FIG. 7h).

Assuming that:
- s1=average distance between front edges of items in a group at the in-feed conveyor,
- s2=average distance between front edges of groups of items at in-feed conveyor,
- s3=distance between front edges of items at the second conveyor, and
- N=number of items in a group at the in-feed conveyor, then the following equations applies:

$$s3 = s2/N \cdot v3/v1. \tag{1}$$

FIG. 8 depicts graphically another embodiment of conveyor system according to the present invention for producing a sequence of discrete food items from plurality of incoming food objects, where the incoming food objects are multiple of batches each of which contains four food items.

In this embodiment, v3≥v1 and both the in-feed and the second conveyor belts are running continuously. For simplicity it will be assumed that v3=v1.

Referring to the definitions for s1-s3 given above, the following equation applies for v2, $$v2 = (s3/(s1 \cdot N)) \cdot v1, \tag{2}$$

and v4=v2 when a batch is being transferred to the first conveyor belt from the in-feed conveyor belt, and v2=v3, and v4=−v when the batch is delivered from the first conveyor belt to the second conveyor belt.

As discussed in relation to FIG. 7, for simplicity it will be assumed that the speed v1 of the in-feed conveyor belt and speed v3 of the second conveyor belt are the same and are running at constant speed at all times and that said imaging further includes imaging the length of the food items within the batches.

FIG. 8a shows where first batch approaches the first conveyor belt, which is in a contracted position. At this time point, the speed v2 of the first conveyor belt and the speed v4 of the junction is zero. As soon as it arrives at the first conveyor the speed v2 of the first conveyor belt and the speed of the junction v4 are started and set to an equal speed value that is larger than the speed of the in-feed conveyor belt and the second conveyor belt, i.e. v1=v3<v2=v4 (see FIG. 8b). Due to this speed difference, the incoming batches will be spaced apart on the first conveyor belt as shown in FIGS. 8c and 8d. However, since the lengths of the food items within the batches are different the spacing of the food items on the first conveyor belt will be uneven.

The advancing of the junction from the contracted position to the extended position is continued (see FIG. 8c) until the difference between the extended position and the contracted position substantially matches the length of the first batch (FIG. 8d). Upon reaching this extended position, the speed v2 of the second conveyor belt is stopped (or reduced) and the advancing v4 of the junction back towards the contracted position starts. The speed v4 of the junction back to the contracted position is adjusted to the length of the food items on the first conveyor belt and the internal position of the food items on the first conveyor belt so as to fulfill said pre-defined distance criterion. Assuming that the distance criterion is a sequence of food items with the same distance between would mean that the speed of the junction must accordingly move faster when delivering longer food items onto the second conveyor belt compared to shorter food items. This means that the speed v4 of the junction when delivering the first food item onto the second conveyor belt (see FIG. 8e) must be less that the speed v4 of the junction when delivering the last food item of this first batch. Further to this, the average speed v4 of the junction is preferably such that upon arrival at the contracted position the second incoming batch has arrived at the first conveyor belt (FIG. 8f) and the speed of the first conveyor belt v2 and the speed of the junction v4 are again set to the same value and the process is repeated (see FIGS. 8g and h).

FIG. 9 depicts graphically yet another embodiment of conveyor system according to the present invention for producing a sequence of discrete food items from plurality of incoming food objects, where the incoming food objects are discrete food items, e.g. chicken fillet or pieces of meat. As discussed in relation to FIGS. 7 and 8, v3≥v1 and both the in-feed and the second conveyor belts are running continuously. For simplicity it will be assumed that v3=v1. When an item is transferred to a second conveyor belt v4=−v, except when an item is to be transferred to the first conveyor belt from the in-feed conveyor belt, but then v2=v4 and v4=v1.

Said image date preferably include date indicating the distance between the incoming food items and the length of each individual food item.

Referring to FIG. 9, initially, one or preferably two or more food items must be collected from the in-feed conveyor belt onto the first conveyor belt as shown in FIG. 9a-d. The speed v2 of the first conveyor belt and the equal speed v4 of the junction are sequentially started when transferring food items onto the first conveyor belt and stopped until the subsequent food item arrives at the first conveyor belt. The transferring distance of the junction to the right each time corresponds to the length of the food item that at that time point is being transferred from the in-feed conveyor belt to the first conveyor belt. In this way, the first conveyor acts as a buffer for the food items.

The step of delivering the food items is adapted to the internal position of the food items on the in-feed conveyor such that the waiting time between adjacent incoming food items is utilized to return food items from the first conveyor belt onto the second conveyor belts, as shown in FIG. 9e. As depicted here, the time it takes for the junction to move back while delivering two food items onto the second conveyor belt as shown in FIG. 9e,f (while stopping the speed v2 of the first conveyor belt) corresponds to the time it takes for the next incoming food item to arrive at the first conveyor belt as shown in FIG. 9f. The speed v2 and the speed v4 of the first conveyor belt and the junction is started, where the traveling distance of the junction corresponds to the length of this incoming objects (see FIG. 9g). The speed v2 is now stopped and the junction is moved again to the left for delivering two food items to the second conveyor belt (see FIG. 9g-h) until it collects the next incoming food item (see FIG. 9j). Accordingly, this interplay between starting the junction and the first conveyor belt when collecting food items from the in-feed conveyor belt onto the first conveyor belt, and delivering the food items from the first conveyor belt to the second conveyor belt is adapted to the distances between the incoming food items in a way that these distances are evenly distributed between the food items on the second conveyor belt, assuming that said pre-determined distance criterion is a fixed distance between the delivered food items.

Accordingly, the transfer of a food item to the first conveyor belt takes priority over delivery of a food item from the first conveyor belt to the second conveyor belt, i.e. the transfer of a food item to the second conveyor belt is halted during a delivery of a food item to the first conveyor belt and resumed afterwards.

As discussed in relation to FIGS. 7 and 8, the speed of the junction back towards a contracted position is preferably adapted to the length of the objects to be delivered onto the second conveyor belt, i.e. the longer the food item is the faster will the speed −v be back towards the contracted position.

Although the embodiments discussed previously are based on that only the second set of adjacent conveyor belt ends are controllable, while the first set of the adjacent conveyor belt ends is stationary, the first set of the adjacent conveyor belt ends may just as well be the ends that are controllable while the second set of adjacent conveyor belt ends is stationary. Further to this, also both the first and the second set of adjacent conveyor belt ends by be controllable and are operated in a synchronized so as to fulfill the pre-determined distance criterion.

As an example, the following operation may be applied in case only the first set of adjacent conveyor belt ends is moveable, e.g. via a further junction as discussed previously, while the second set of adjacent conveyor belt ends is stationary.

i. The first conveyor belt is operated start-stop and it is acting as a buffer as described previously.

ii. Every time an item is to be delivered to the second conveyor belt, the first conveyor belt is running, otherwise it is stopped. This operation has priority over the take-item-on-board operation at the first end of this conveyor belt.

iii. When an item approaches the first conveyor belt from the in-feed conveyor belt the movable junction is moved (quickly) towards the in-feed conveyor belt to take the item on board without running the first conveyor belt.

iv. If an item is to be delivered to the second conveyor belt while an item is transferred from the in-feed conveyor belt to the first conveyor belt, then the in-feed conveyor belt starts running as described in point ii above; and the movable junction maintains its relative position compared to the items under transfer from the in-feed conveyor belt to the first conveyor belt. Preferably, the in-feed conveyor belt and the first conveyor belt run at the same speed (when the first conveyor runs) but it is not necessary that the first and the second conveyors are running the same speed. It is further preferred that there is a short space between the items on the in-feed conveyor belt, but such requirement may e.g. be met by implementing an intermediate conveyor belt between the in-feed conveyor belt and the first conveyor belt, where this intermediate conveyor belt is running a little faster that the in-feed conveyor.

Figure 10:
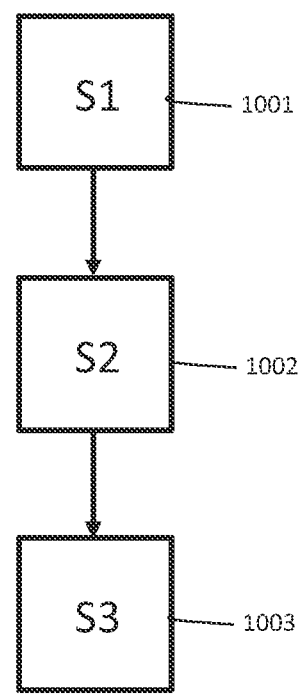
FIG. 10 shows a method according to the present invention of producing a sequence of discrete food items from plurality of incoming food objects.

FIG. 10 shows a flowchart of a method according to the present invention for producing a sequence of discrete food items from plurality of incoming food objects conveyed by an in-feed conveyor belt, each of the incoming food objects including at least one food item, where that the distance between adjacent food items of said sequence of discrete food objects fulfills a pre-determined distance criterion. The objects may be a discrete single food items such as chicken breast or the object may be a batch made of two or more food items, e.g. a fish fillet, poultry fillet or meat such as meat fillet that has been cut into several pieces. The pre-determined distance criterion may as an example be fixed distance between the food objects, or e.g. pre-determined repetition of two or more distances, i.e. a kind of a controllable distance pattern where e.g. 2 food items are close to each other with only 2 cm distance between and form thus a kind of a batch, but where the distance between adjacent "batches" is 10 cm.

In step S1, incoming objects are imaged so as to obtain image data including image data indicating the length of the incoming objects and distances between adjacent incoming objects.

In step S2, at least one of the incoming food objects are conveyed onto a first conveyor belt placed downstream to the in-feed conveyor belt. The adjacent ends of the in-feed conveyor belt and the first conveyor belt form a first set of adjacent conveyor belt ends. The first conveyor belt acts as a buffer for collecting at least one of incoming food objects from the in-feed conveyor belt. A second conveyor belt is placed downstream to the first conveyor belt forming a second set of adjacent conveyor belt ends. Either one or both set of the adjacent conveyor belt ends may be operable connected together via a junction such that their internal position is fixed at all times.

In step S3, the back and forth movement of at least one of the first set of adjacent conveyor belt ends or second set of adjacent conveyor belt ends is controlled by a control unit. By doing so, the active length of the first conveyor belt may be adjusted. Accordingly, the controlling of the delivering of the at least one collected food objects onto the second conveyor belt is achieved via controllable movement of at least one of the first set of adjacent conveyor belt or the second set of adjacent conveyor belt ends based on the image data.

For various embodiments of steps S1-S3, a reference is e.g. made to the previous embodiment discussed in relation to FIGS. 7-9.

Figure 11A:
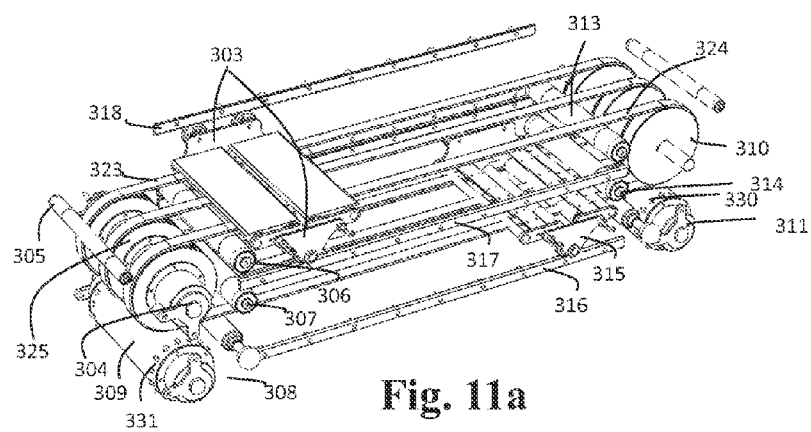
FIGS. 11a-c show an embodiment of a conveyor system in a perspective view, a side view and from above, respectively, which embodiment essentially corresponds to the system shown in FIG. 3, but with the in-feed conveyor belt, the first and the second conveyor belt removed.
Figure 11B:
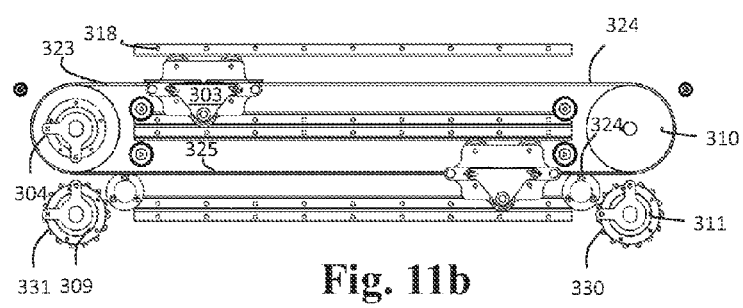
Figure 11C:
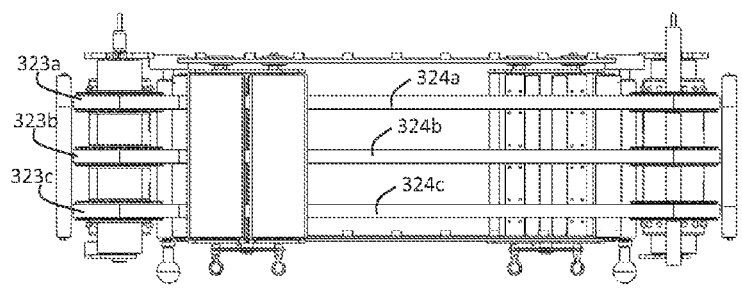

FIGS. 11a-c shows furthermore an embodiment of a conveyor system essentially corresponding to the system shown in FIG. 3, but with the in-feed conveyor belt 321, the first conveyor belt 301 and the second conveyor belt 302 removed and with FIG. 11a showing a perspective view, FIG. 11b showing a side view and FIG. 11c showing the conveyor system from above. However, even though the conveyor belts have been removed, the various means for supporting and driving the first conveyor belt 301 and the second conveyor belt 302 have been shown for clarity. Thus, the rollers 305-308 related to the first conveyor belt 301, e.g. idle rollers 305-308 and the drive roller 309, which comprises the outwardly protruding pins 331 for engaging with the holes on the opposite sides of the first conveyor belt 301 are shown. Correspondingly for the second conveyor belt 302, where the various rollers 310, 312-314 are shown, e.g. idle rollers 312-314 and the drive roller 311, with the outwardly protruding pins 330 for engaging with the holes on the opposite sides of the second conveyor belt 302. Further, the junction 303, which is slidable mounted to the first set of a rail structure 317, 318 is shown in further detail in FIGS. 11a-c as well as the further, lower junction 315, which is slidable mounted to the second rail structure 316. Also in FIGS. 11a-c the first set of tooth belts 323 is clearly shown, connecting the junction 303 with the further junction 315 as the first set of tooth belts 323 from the junction 303 is led via the roller 325 (comprising e.g. three tooth wheels which engage with the tooth belts 323) to the further junction 315, where it is connected. Further, the second set of tooth belts 324 is similarly connected to the other side of the junction 303, from which it is led via the roller 310 (comprising e.g. three tooth wheels which engage with the tooth belts 324) to the further junction 315, where it is connected. Also shown is the rotor 304 for driving the rollers 325 and thereby the set of toothed belts. As shown in FIGS. 11a and 11c, each of the sets of tooth belts 323, 324 comprises three belts each, e.g. 323a-c and 324a-c as shown in FIG. 11c, but it is apparent that less than three or more than three belts can be utilized. As it is shown, the first set of tooth belts 323 will on its route from the junction 303, where it is connected, cf. e.g. by means of the elongated beams 602, 603 shown in FIG. 6a, to the roller 325 be located directly under the first conveyor belt 301 (not shown in FIGS. 11a-c) and may thus serve as additional support for the first conveyor belt 301, e.g. when it is transporting relatively heavy and/or numerous items. Also, it will be understood that the roller 325 may serve as additional support for the first conveyor belt 301. Similar applies as regards the second set of tooth belts 324 and/or the roller 310, which may serve as additional support for the second conveyor belt 302 (not shown in FIG. 11).

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A conveyor system for producing a sequence of discrete food items from a plurality of incoming food objects conveyed by an in-feed conveyor belt, each of the incoming food objects including at least one food item, where the distance between adjacent food items of said sequence of discrete food items fulfills a pre-determined distance criterion, said conveyor system comprising:
   a first conveyor belt, where an upstream end of said first conveyor belt is placed adjacent to a downstream end of said in-feed conveyor belt forming a first set of adjacent conveyor belt ends,
   a second conveyor belt, where an upstream end of said second conveyor belt is placed adjacent to a downstream end of said first conveyor belt forming a second set of adjacent conveyor belt ends connected together via a junction, wherein said first conveyor belt and said second conveyor belt are closed loop belts, which furthermore are connected via a lower junction, positioned below the surface of said first conveyor belt and said second conveyor belt, said junction and said lower junction being connected via a set of tooth belts extending between the junction and the lower junction via a roller located below the first conveyor belt and a roller located below the second conveyor belt,
   an imaging mechanism for imaging said incoming food objects so as to obtain image data including image data indicating the length of the incoming food objects and distances between adjacent incoming food objects,
   a control unit adapted to operate a back and forth movement of said second set of adjacent conveyor belt ends while maintaining the internal position of the adjacent conveyor belt ends fixed and thus adjust the active length of the first conveyor belt, said control unit being configured for operating said back and forth movement of said second set of adjacent conveyor belt ends via said set of tooth belts connecting said junction and said lower junction,
wherein said first conveyor belt acts as a buffer for collecting at least one of said incoming food objects from said in-feed conveyor belt, and where said control unit operates the delivering of said at least one collected food objects to said second conveyor belt via controllable movement of said second set of adjacent conveyor belt ends based on said image data.

2. A conveyor system according to claim 1, wherein said control unit is further adapted to operate a back and forth movement of said first set of adjacent conveyor belt ends based on said image data.

3. A conveyor system according to claim 1, wherein said incoming food objects are multiple of batches each of which includes two or more food items, said image data further including the length of said food items within the batches.

4. A conveyor system according to claim 3, wherein collecting at least one of said incoming food objects onto said first conveyor belt is operated by said control unit and comprises, upon arrival of a first batch at the first conveyor belt:

advancing the second set of adjacent conveyor belt ends with a speed matching the speed of the first conveyor belt from a contracted position towards an extended position, where the length between the extended position and the contracted position substantially matches the length of said first batch, said delivering including advancing the second set of adjacent conveyor belt ends back to the contracted position and adjusting the speed of the first conveyor belt such that it becomes less than the speed of the second conveyor belt, the speed of the second set of adjacent conveyor belt ends back to said contracted position being selected such that upon arrival at the contracted position a second batch has arrived at the first conveyor belt.

5. A conveyor system according to claim 4, wherein said advancing of the second set of adjacent conveyor belt ends back to the contracted position is adapted to the length of said food items within the batches such that the delivering of said at least one collected food objects to said second conveyor belt results in a sequence of discrete food items that fulfills said pre-determined distance criterion.

6. A conveyor system according to claim 1, wherein said incoming food objects are multiple of discrete food items, wherein collecting at least one of said incoming food objects onto said first conveyor belt is operated by said control unit and comprises, upon arrival of a first food item at the first conveyor belt, a) advancing the second set of adjacent conveyor belt ends with a speed matching the speed of the first conveyor belt from a contracted position towards an extended position, the length between said contracted position and said extended position substantially matching the length of said first food item, b) halting the second set of adjacent conveyor belt ends and the first conveyor belt until a second food item arrives at the first conveyor belt and repeating step a) for said second food item, c) continuing steps a) and b) for at least one subsequent item.

7. A conveyor system according to claim 6, wherein collecting and/or delivering said at least one collected food objects to said first conveyor belt and/or said second conveyor belt is synchronized to the internal position of the incoming food items such that collecting said food items from the in-feed conveyor belt onto the first conveyor belt is triggered as soon as a food item arrives at the first conveyor belt, where in-between the delivering of said at least one collected food item from said first conveyor belt to said second conveyor belt is triggered via movement of the second set of adjacent conveyor belt ends towards said contracted position.

8. A conveyor system according to claim 1, wherein said set of tooth belts connecting said junction and said lower junction comprises a first set of tooth belts and a second set of tooth belts, said first set of tooth belts extending between the junction and the lower junction via said roller located below the first conveyor belt and said second set of tooth belts extending between the junction and the lower junction via said roller located below the second conveyor belt.

9. A method of producing a sequence of discrete food items from a plurality of incoming food objects conveyed by an in-feed conveyor belt, each of the incoming food objects including at least one food item, where the distance between adjacent food items of said sequence of discrete food items fulfills a pre-determined distance criterion, said method comprising:

imaging said incoming food objects to obtain image data including image data indicating the length of the incoming food objects and distances between adjacent incoming food objects, conveying at least one of said incoming food objects onto a first conveyor belt, where an upstream end of said first conveyor belt is placed adjacent to a downstream end of said in-feed conveyor belt forming a first set of adjacent conveyor belt ends, the first conveyor belt acting as a buffer for collecting at least one of said incoming food objects from said in-feed conveyor belt, where an upstream end of a second conveyor belt is placed adjacent to a downstream end of said first conveyor belt forming a second set of adjacent conveyor belt ends, said second set of adjacent conveyor belt ends being connected together via a junction, wherein said first conveyor belt and said second conveyor belt are closed loop belts, which furthermore are connected via a lower junction, positioned below the surface of said first conveyor belt and said second conveyor belt, said junction and said lower junction being connected via a set of tooth belts extending between the junction and the lower junction via a roller located below the first conveyor belt and a roller located below the second conveyor belt, controlling by a control unit back and forth movement of said second set of adjacent conveyor belt ends, while maintaining the internal position of the adjacent conveyor belt ends fixed, and thus adjust the active length of the first conveyor belt, said control unit being configured for operating said back and forth movement of said second set of adjacent conveyor belt ends via said set of tooth belts connecting said junction and said lower junction wherein the controlling includes controlling the delivering of said at least one collected food objects onto said second conveyor belt via controllable movement of said second set of adjacent conveyor belt ends based on said image data.

10. A method according to claim 9, wherein said incoming food objects are multiple of batches each of which includes two or more food items, said image data further including the length of said food items within the batches, said step of collecting at least one of said incoming food objects onto said first conveyor belt is operated by said control unit and comprises, upon arrival of a first batch at the first conveyor belt, advancing the second set of adjacent conveyor belt ends with a speed matching the speed of the first conveyor belt from a contracted position towards an extended position, where the length between the extended position and the contracted position substantially matches the length of said first batch, said delivering including advancing the second set of adjacent conveyor belt ends back to the contracted position and adjusting the speed of the first conveyor belt such that it becomes less that the speed of the second conveyor belt, the speed of the second set of adjacent conveyor belt ends back to said contracted position being selected such that upon arrival at the contracted position a second batch has arrived at the first conveyor belt.

11. A method according to claim 10, wherein said advancing of the second set of adjacent conveyor belt ends back to the contracted position is adapted to the length of said food items within the batches such that the longer the food items are the faster is the speed of the second set of adjacent conveyor belt ends such that the delivering of said at least one collected food objects to said second conveyor belt results in a sequence of discrete food items that fulfills said pre-determined distance criterion.

12. A method according to claim 9, wherein during said collecting of at least one of said incoming food objects the speed of the second set of adjacent conveyor belt ends and the first conveyor belt are larger than the speed of the in-feed conveyor belt.

13. A method according to claim 9, wherein during said collecting of at least one of said incoming food objects the speed of the second set of adjacent conveyor belt ends and the first conveyor belt are equal to the speed of the in-feed conveyor belt.

14. A method according to claim 9, wherein the speed of the in-feed conveyor belt and the second conveyor belts are equal.

15. A method according to claim 9, wherein said incoming food objects are multiple of discrete food items, wherein collecting at least one of said incoming food objects onto said first conveyor belt is operated by said control unit and comprises, upon arrival of a first food item at the first conveyor belt, a) advancing the second set of adjacent conveyor belt ends with a speed matching the speed of the first conveyor belt from a contracted position towards an extended position, the length between said contracted position and said extended position substantially matching the length of said first objects, b) halting the second set of adjacent conveyor belt ends and the first conveyor belt until a second food item arrives at the first conveyor belt and repeating step a) for said second item, c) continuing steps a) and b) for at least one subsequent item.

16. A method according to claim 15, wherein collecting and/or delivering said at least one collected food objects to said first conveyor belt and/or said second conveyor belt is synchronized to the internal position of the incoming food items such that collecting said food items from the in-feed conveyor belt onto the first conveyor belt is triggered as soon as a food item arrives at the first conveyor belt, where in-between the delivering of said at least one collected food item from said first conveyor belt to said second conveyor belt is triggered.

17. A computer program comprising instructions for carrying out the steps of the method according to claim 9 when said computer program is executed on a suitable computer device.

* * * * *

UNITED STATES PATENT AND TRADEMARK OFFICE
CERTIFICATE OF CORRECTION

| | | |
|---|---|---|
| PATENT NO. | : 9,145,268 B2 | |
| APPLICATION NO. | : 14/395950 | |
| DATED | : September 29, 2015 | |
| INVENTOR(S) | : Thorir Finnsson and Kristjan Hallvardsson | |

It is certified that error appears in the above-identified patent and that said Letters Patent is hereby corrected as shown below:

In the Specification

Column 9, Line 15 "Figure shows an embodiment of a conveyor system 300" should read -- Figure 3 shows an embodiment of a conveyor system 300 --

Signed and Sealed this
Fifteenth Day of March, 2016

Michelle K. Lee
*Director of the United States Patent and Trademark Office*